United States Patent
Feng et al.

(10) Patent No.: US 9,194,985 B1
(45) Date of Patent: Nov. 24, 2015

(54) COLOR FILTER SUBSTRATE, MANUFACTURING METHOD THEREOF, AND DISPLAY PANEL

(71) Applicants: BOE TECHNOLOGY GROUP CO., LTD., Beijing (CN); BEIJING BOE DISPLAY TECHNOLOGY CO., LTD., Beijing (CN)

(72) Inventors: Lan Feng, Beijing (CN); Qingna Hou, Beijing (CN)

(73) Assignees: BOE TECHNOLOGY GROUPCO., LTD., Beijing (CN); BEIJING BOE DISPLAY TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 14/472,199

(22) Filed: Aug. 28, 2014

(30) Foreign Application Priority Data

Jun. 25, 2014 (CN) .......................... 2014 1 0289619

(51) Int. Cl.
| | |
|---|---|
| *G02F 1/1335* | (2006.01) |
| *G06F 3/041* | (2006.01) |
| *G02B 5/20* | (2006.01) |
| *G02F 1/1333* | (2006.01) |

(52) U.S. Cl.
CPC ............ *G02B 5/201* (2013.01); *G02F 1/13338* (2013.01); *G02F 1/133512* (2013.01); *G02F 1/133516* (2013.01); *G02F 2001/133519* (2013.01)

(58) Field of Classification Search
CPC .................... G02F 1/133512; G02F 1/133514; G06F 3/041

USPC .......................................... 349/106; 345/173
See application file for complete search history.

(56) References Cited

U.S. PATENT DOCUMENTS

| | | | | | |
|---|---|---|---|---|---|
| 7,838,886 | B2* | 11/2010 | Kim | .................. | G02F 1/136213 257/49 |
| 2006/0285062 | A1* | 12/2006 | Kim | .................. | G02F 1/133512 349/156 |
| 2014/0118419 | A1* | 5/2014 | Wu | ........................ | G06F 3/0412 345/690 |
| 2014/0184940 | A1* | 7/2014 | Ma | ....................... | G02F 1/13338 349/12 |
| 2015/0212635 | A1* | 7/2015 | Lee | ....................... | G06F 3/0412 345/174 |

* cited by examiner

*Primary Examiner* — Daniel Whalen
(74) *Attorney, Agent, or Firm* — Kinney & Lange, P.A.

(57) ABSTRACT

A color filter substrate comprising: a base plate; a first conductive layer formed on the base plate in a first direction; a color resistance layer formed on the first conductive layer at positions at least corresponding to pixel regions, wherein the color resistance layer is formed with via holes at positions corresponding to each sub-pixel region; a black matrix formed on the first conductive layer at positions corresponding to pixel gaps; a second conductive layer formed on the surfaces of the black matrix and the color resistance layer in a second direction different from the first direction; a dielectric layer formed at least on the second conductive layer, wherein the dielectric layer is formed with via holes corresponding to the via holes in the color resistance layer; and a third conductive layer formed on the dielectric layer and electrically connected with a corresponding portion of the first conductive layer through aligned via holes of the color resistance layer and the dielectric layer.

20 Claims, 4 Drawing Sheets

COLOR FILTER SUBSTRATE, MANUFACTURING METHOD THEREOF, AND DISPLAY PANEL

CROSS-REFERENCE TO RELATED APPLICATION

This application claims the benefit of Chinese Patent Application No. 201410289619.9 filed on Jun. 25, 2014 in the State Intellectual Property Office of China, the whole disclosure of which is incorporated herein by reference.

BACKGROUND OF THE INVENTION

1. Field of the Invention

The embodiments of the present invention relate to a field of display technology, and more particularly, relate to a color filter substrate, a method for manufacturing the color filter substrate, and a display panel comprising the color filter substrate.

2. Description of the Related Art

With development of electro-optical technology and semiconductor manufacturing technology, a touch screen has become a new information input device. The touch screen has become a completely new and attractive multimedia interactive equipment because of its simple, convenient and natural human-computer interaction. Taking a liquid crystal display (LCD) panel as an example, the panel mainly comprises an array substrate, a color filter (CF) substrate, and a liquid crystal layer positioned therebetween. When the LCD panel operates, light from a backlight source, after being modulated by liquid crystal molecules, is incident on the CF substrate, and then represents red color, green color and blue color with the filter action of the red, green and blue color resistances of the CF substrate. The CF substrate is a main member for achieving color display, and usually comprises a glass substrate, a black matrix (BM), color resistance layer and the like, wherein different color resistances allow light of corresponding color bands to pass through, and thus the color display is achieved.

With the wide use of the touch panel, the touch panel is lighter and thinner, and One Glass Solution (OGS) type touch panel, In Cell type touch panel become more popular in high-end markets. OGS type means an ITO conductive film and sensors are directly formed on the outermost protection glass, that is, an outermost protection glass and a touch screen are combined as one panel, while the conventional touch panel comprises in order an outermost protection glass, an intermediate touch screen, and an innermost display screen. The In Cell type means that a touch screen is sandwiched between the array substrate and the CF substrate.

SUMMARY OF THE INVENTION

Embodiments of the present invention are directed to further improve the quality of the In Cell type touch panel by providing a CF substrate, a manufacturing method thereof, and a display panel comprising the CF substrate.

According to one aspect of the embodiments of the present invention, a color filter substrate is provided. The color filter substrate comprises:

a base plate;

a first conductive layer formed on the base plate in a first direction;

a color resistance layer formed on the first conductive layer at least at positions corresponding to pixel regions, wherein the color resistance layer is formed with via holes at positions corresponding to each sub-pixel region, the first conductive layer being exposed by the via holes;

a black matrix formed on the first conductive layer at positions corresponding to pixel gaps;

a second conductive layer electrically insulated from the first conductive layer and formed on the surfaces of the black matrix and the color resistance layer in a second direction different from the first direction, wherein the second conductive layer is formed at gaps between the via holes;

a dielectric layer formed at least on the second conductive layer, wherein the dielectric layer is formed with via holes corresponding to the via holes in the color resistance layer, and the corresponding via holes in the dielectric layer and the color resistance layer are aligned with each other in a thickness direction of the base plate; and a third conductive layer formed on the dielectric layer and electrically connected with a corresponding portion of the first conductive layer through the aligned via holes of the color resistance layer and the dielectric layer.

According to another aspect of the embodiments of the present invention, a display panel is provided, the display panel comprising the above color filter substrate.

According to still another aspect of the embodiments of the present invention, a method for manufacturing a color filter substrate is provided, the method comprising steps of:

forming and patterning a first conductive layer on a base plate in a first direction;

forming and patterning a color resistance layer at least on the first conductive layer at positions corresponding to pixel regions, and forming and patterning a black matrix on the first conductive layer at positions corresponding to pixel gaps, wherein the color resistance layer is formed with via holes at positions corresponding to each sub-pixel region, the first conductive layer being exposed by the via holes;

forming and patterning a second conductive layer on the surfaces of the black matrix and the color resistance layer in a second direction different from the first direction, wherein the second conductive layer is formed at gaps between the via holes, and the second conductive layer is insulated from the first conductive layer;

forming and patterning a dielectric layer at least on the second conductive layer, wherein the dielectric layer is formed with via holes corresponding to the via holes in the color resistance layer, and the corresponding via holes in the dielectric layer and the color resistance layer are aligned with each other in a thickness direction of the base plate; and forming and patterning a third conductive layer on the dielectric layer, wherein the third conductive layer is electrically connected with a corresponding portion of the first conductive layer through the aligned via holes of the color resistance layer and the dielectric layer.

BRIEF DESCRIPTION OF THE DRAWINGS

The above and other features of the present invention will become more apparent by describing in detail exemplary embodiments thereof with reference to the accompanying drawings, in which.

DETAILED DESCRIPTION OF PREFERRED EMBODIMENTS OF THE INVENTION

Figure 1:
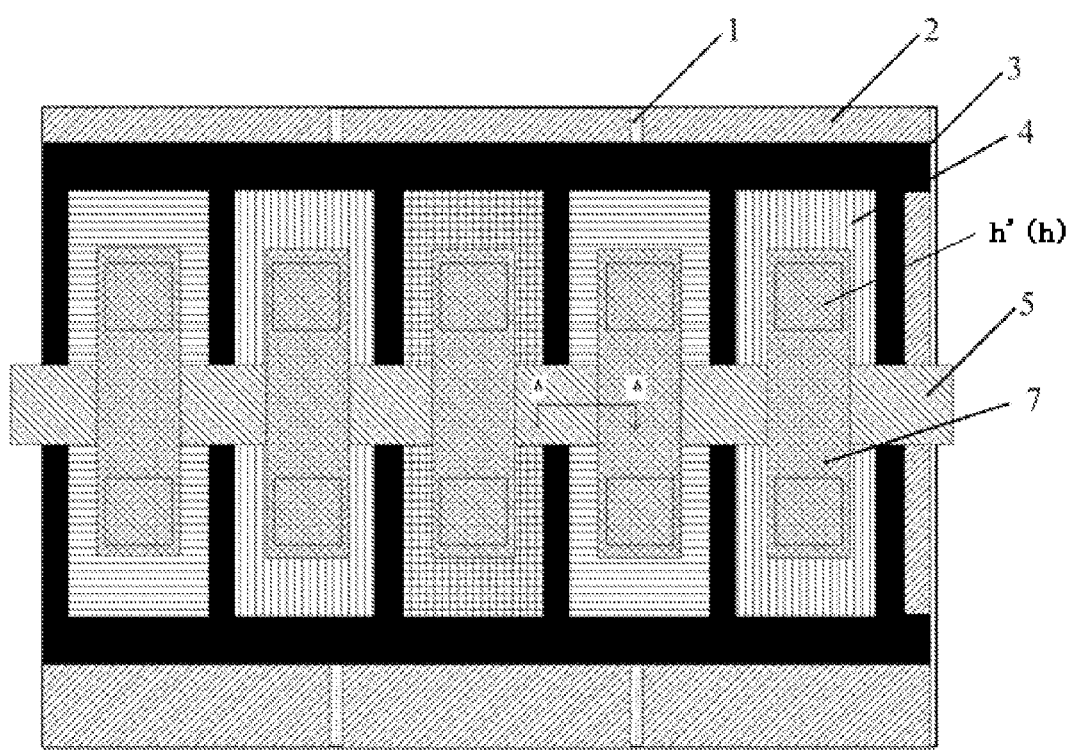
FIG. 1 is a schematic view showing the structure of a color filter substrate according to an embodiment of the present invention, wherein the spacer structure, the dielectric layer and the insulation layer are not shown for the purpose of clarity.

Exemplary embodiments of the present disclosure will be described hereinafter in detail with reference to the attached drawings, wherein the like reference numerals refer to the like elements. The present disclosure may, however, be embodied in many different forms and should not be construed as being limited to the embodiment set forth herein; rather, these embodiments are provided so that the present disclosure will be thorough and complete, and will fully convey the concept of the disclosure to those skilled in the art.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Figure 2:
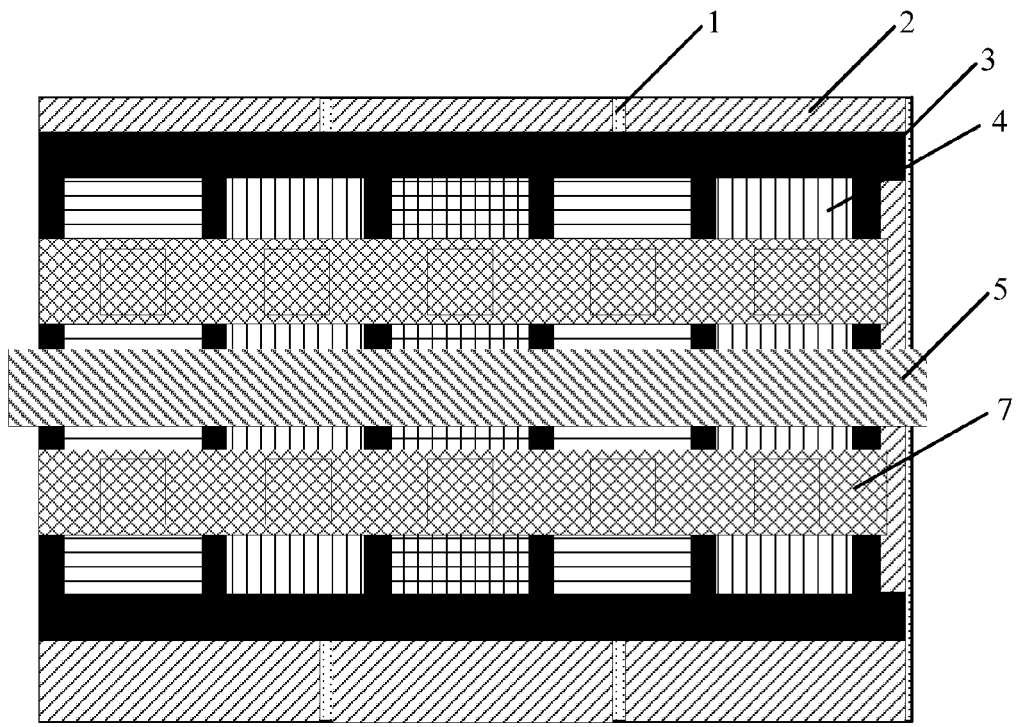
FIG. 2 is a schematic view showing the structure of a color filter substrate according to another embodiment of the present invention, wherein the spacer structure, the dielectric layer and the insulation layer are not shown for the purpose of clarity.

Referring to FIGS. 1-2, the color filter substrate according to an exemplary embodiment of the present invention comprises:

a base plate 1;

a first conductive layer 2 formed on the base plate 1 in a first direction;

a black matrix 3 formed at positions of the first conductive layer 2 corresponding to pixel gaps;

a color resistance layer 4 formed on the first conductive layer 2 at positions at least corresponding to pixel regions, wherein the color resistance layer 4 is formed with via holes h at positions corresponding to each sub-pixel region, the first conductive layer 2 being exposed by the via holes h;

a second conductive layer 5 electrically insulated from the first conductive layer 1 and formed on the surfaces of the black matrix 3 and the color resistance layer 4 in a second direction different from the first direction, wherein the second conductive layer is formed at gaps between the via holes, that is, the second conductive layer 5 does not overlap with the via holes in the color resistance layer so that a third conductive layer 7 (to be described later) may be electrically connected with the first conductive layer 2 below through the via holes in the color resistance layer;

a dielectric layer 6 formed at least on the second conductive layer 5, wherein the dielectric layer 6 is formed with via holes h' corresponding to the via holes h in the color resistance layer 4, and the corresponding via holes h, h' in the dielectric layer and the color resistance layer are aligned with each other in a thickness direction of the base plate 1; and the third conductive layer 7 formed on the dielectric layer 6 and electrically connected with a corresponding portion of the first conductive layer 2 through the aligned via holes h, h' of the color resistance layer 4 and the dielectric layer 6.

The first conductive layer 2 is formed on the base plate 1 and used as a bottom electrode of a projective capacitor. In the present invention, the first conductive layer 2 is provided inside the color filter substrate rather than outside the color filter substrate, and the first conductive layer 2 may be used as a shielding layer at the same time.

The base plate 1 may be made of glass, silicon pellet, quartz, plastics or other material. Usually, the base plate 1 is made of glass.

The first conductive layer 2 is made of transparent conductive material, for example, transparent metal film, transparent metallic oxide film, non-metallic oxide film, particle-dispersion ferroelectric material or the like, and the film may be a single-layer film, a double-layer film, a multilayer film, the film may be of a doping type, a non-doping type or a multi-element type. In an embodiment of the present invention, the transparent conductive material comprises a metallic oxide film, for example, a Indium Tin Oxide (ITO) film.

The black matrix 3 is used to reduce light leakage between pixel regions, and is made of light-blocking material. Alternatively, the black matrix 3 is made of resin doped with light-blocking material.

The color resistance layer 4 may comprise RGB color resistance or RGBW color resistance.

The color resistance layer 4 may have one or more via holes corresponding to each sub-pixel region, each via hole being used to expose the first conductive layer 2 below. In an embodiment of the present invention, for each sub-pixel region, two square via holes are formed. In the present invention, the locations, shape and number of the via holes in the color resistance layer are not limited to the specific embodiments mentioned in the present invention. However, the whole area of the via holes in the color resistance layer corresponding to each sub-pixel region should not be greater than a certain percent of the whole area of each sub-pixel region; each via hole should be within an area of the color resistance layer that is covered by the third conductive layer; the number of the via holes for each sub-pixel region should be proper so as not to affect the function of the color resistance layer. In brief, the number, shape and size of the via holes should balance the requirements regarding aperture ratio and light-saturation level.

In an alternative embodiment of the present invention, the first direction is perpendicular to the second direction.

The second conductive layer 5 is made of transparent conductive material, for example, transparent metal film, transparent metallic oxide film, non-metallic oxide film, particle-dispersion ferroelectric material or the like, and the film may be a single-layer film, a double-layer film, a multilayer film, the film may be of a doping type, a non-doping type or a multi-element type. In an embodiment of the present invention, the transparent conductive material comprises a metallic oxide film, for example, a Indium Tin Oxide (ITO) film.

In an alternative embodiment of the present invention, the dielectric layer 6 is made of inorganic dielectric material, for example, SiNx.

In an exemplary embodiment of the present invention, the third conductive layer 7 comprises a plurality of conductive strips which are separated from each other and are electrically connected with the corresponding portions of the first conductive layer 2.

As shown in FIG. 1, the color resistance layer 4 is formed with two via holes h corresponding to each sub-pixel region, and the two via holes h are provided at two sides of the second conductive layer 5 respectively. The via holes h' in the dielectric layer 6 are arranged correspondingly.

Further, the third conductive layer 7 comprises a plurality of first conductive strips corresponding to each sub-pixel region respectively, wherein the portions of each of the first conductive strips at the two sides of the second conductive layer 5 are directly above corresponding two via holes respectively; and each of the plurality of first conductive strips extends in the first direction, that is, the direction in which each first conductive strip extends is the same as the direction in which the first conductive layer extends.

As shown in FIGS. 1-2, the via holes h' in the dielectric layer at each side of the two sides of the second conductive layer 5 are aligned in a line. The via holes h in the color resistance layer 4 at each side of second conductive layer 5 are also aligned in a line.

Referring to FIG. 2, in an alternative embodiment of the present invention, the third conductive layer 7 comprises two second conductive strips which are provided at two sides of the second conductive layer 5 respectively and extend in the second direction, wherein each second conductive strip covers corresponding via holes h' which are aligned in a line.

In the present invention, the extending direction of the third conductive layer 7 is not limited, as long as the third conductive layer 7 may cover corresponding via hole regions of the dielectric layer 6.

The third conductive layer 7 is made of transparent conductive material, for example, transparent metal film, transparent metallic oxide film, non-metallic oxide film, particle-dispersion ferroelectric material or the like, and the film may be a single-layer film, a double-layer film, a multilayer film, the film may be of a doping type, a non-doping type or a multi-element type. In an embodiment of the present invention, the transparent conductive material comprises a metallic oxide film, for example, a Indium Tin Oxide (ITO) film.

Though not shown, in an alternative embodiment of the present invention, the third conductive layer may comprise a plurality of conductive sheets which are separated from each other and electrically connected with the corresponding portions of the first conductive layer.

Figure 5:
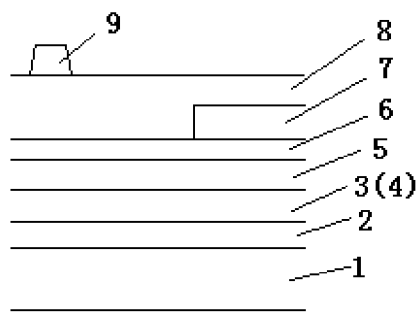
FIG. 5 is a partial cross section view in A-A direction in FIG. 1, and the color filter substrate in FIG. 1 comprises the spacer, the dielectric layer and the insulation layer.

In an embodiment of the present invention, referring to FIG. 5, the CF substrate may further comprise an insulation layer 8 covering the base plate 1 on which the third conductive layer 7 has been formed. The insulation layer is made of insulation material, for example, an organic coating (OC) insulation film. The thickness of the OC insulation film may be in a range of 2-3 μm.

In an embodiment of the present invention, referring to FIG. 5, the CF substrate may further comprise spacers 9. The spacers 9 are formed on the insulation layer 8 at positions corresponding to and above the black matrix 3.

The spacers 9 function to insure the thickness of the display panel, and may be made of material with high elastic recovery rate and high pressure deformation capability, thus, the CF substrate is more stable in later celling process and thus the display panel has greater anti-compression and anti-deformation capability.

Figures 3A, 3B:
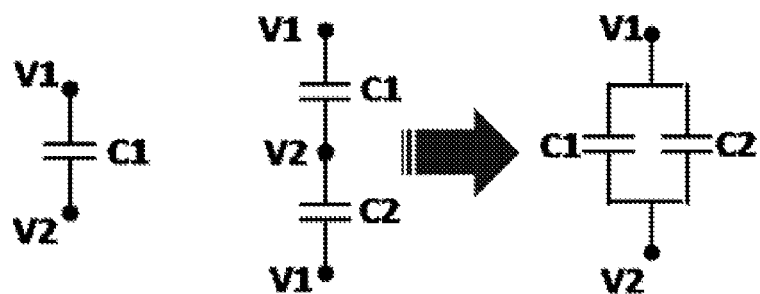
FIGS. 3A and 3B show the comparison between the capacitor structure according to the present invention and the capacitance structure in the prior art.
Figure 4:
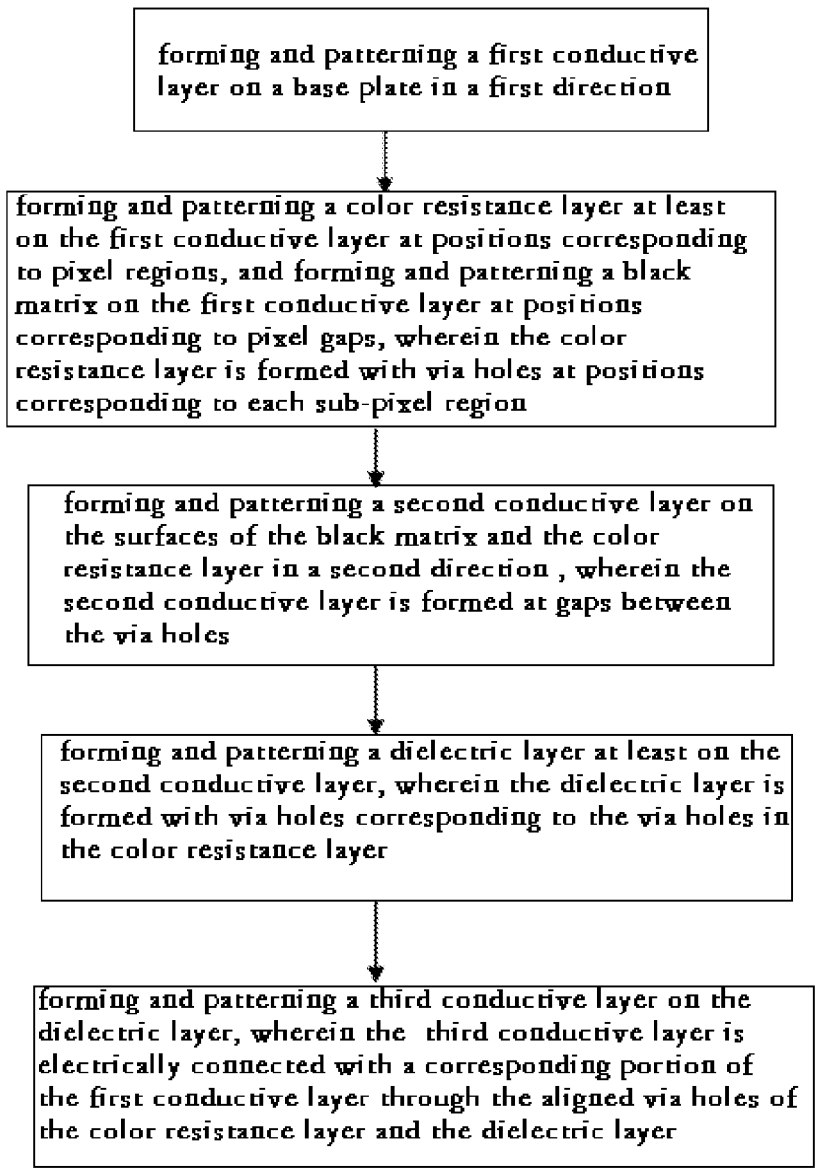
FIG. 4 shows the flow chart for manufacturing a color filter substrate according to one exemplary embodiment of the present invention.

In a projective capacitive touch panel, the crossing of x-electrode and y-electrode forms the capacitor, and change of a touch signal is sensed by means of change of the capacitance due to contacting with a conductive body. In the CF substrate according to the present invention, another conductive layer (the third conductive layer) is added based on original pixel size, thus, another touch capacitor C2 is introduced, which reduces the contact resistance of the bottom electrode (the first conductive layer), and at the same time increases touch sensitivity of the touch panel having a high resolution. Specifically, on the CF substrate are formed in order the first conductive layer used as the bottom electrode of the projective capacitor, the color resistance layer, the second conductive layer, the dielectric layer, and the third conductive layer, wherein the third conductive layer is electrically connected with the first conductive layer through via holes in the color resistance layer and the dielectric layer. Thus, for example, based on the pixel structure of a conventional Advanced Super-Dimension Switching (ADS) type, another conductive layer is added at another side of the second conductive layer. As a result, with the same pixel size, a projective capacitor is added to the capacitor structure of the conventional touch panel shown in FIG. 3a, and thus an overlap capacitor structure is formed, that is, as shown in FIG. 3b, the second conductive layer forms a capacitor C1 together with the first conductive layer, and at the same time forms a capacitor C2 together with the third conductive layer, wherein the capacitors C1 and C2 are connected in parallel, and the color resistance layer and the dielectric layer are used as the dielectrics of the capacitors C1 and C2 respectively. Specifically, the third and first conductive layers are electrically connected with each other by via holes, thus, the potential of the third conductive layer is the same as that of the first conductive layer, and the overlap capacitance is formed at the overlap position of the third and second conductive layers, such an overlap capacitance may be used as a projective capacitance of the touch panel, as shown in FIG. 3b. Therefore, for a pixel unit, the projective capacitance thereon will be increased, and further, the touch sensitivity of the touch panel is improved when the color filter substrate according to the present invention is applied to a high-resolution panel.

In the CF substrate according to the present invention, the via hole design, while meeting the requirements regarding high resolution, may effectively improve the aperture rate and thus insure the transmission rate of the display panel.

Further, in an embodiment of the present invention, the insulation film is provided to the CF substrate. The insulation film is used as the outermost layer of the CF substrate for planarization, and also may isolate LC so as to prevent touch signals from interfering with pixel display signals. Furthermore, by selecting the thickness of the insulation layer and the color resistance layer, a sufficient spatial height difference between the display part and the touch part of the display panel is generated, which further reduces the interference between the touch signals and the pixel display signals. Therefore, the interference on the electric field for the pixels is reduced and normal display of the picture is ensured.

The embodiments of the present invention also relate to a display panel comprising the above CF substrate.

The embodiments of the present invention also relate to a display device comprising the above display panel.

According to another aspect of the present invention, a method for manufacturing a CF substrate is provided. The method comprises the following steps:

forming and patterning (for example, by etching) a first conductive layer 2 on a base plate 1 in a first direction;

forming and patterning (for example, by etching) a color resistance layer 4 on the first conductive layer 1 at least at positions corresponding to pixel regions, and forming and patterning (for example, by etching) a black matrix 3 on the first conductive layer 2 at positions corresponding to pixel gaps, wherein the color resistance layer 4 is formed with via holes h at positions corresponding to each sub-pixel region, the first conductive layer 2 being exposed by the via holes;

forming and patterning (for example, by etching) a second conductive layer 5 on the surfaces of the black matrix 3 and the color resistance layer 4 in a second direction different from the first direction, wherein the second conductive layer 5 is formed at gaps between the via holes (that is, the second conductive layer 5 does not overlap with the via holes), and the second conductive layer 5 is insulated from the first conductive layer 1;

forming and patterning (for example, by etching) a dielectric layer 6 at least on the second conductive layer 5, wherein the dielectric layer 6 is formed with via holes h' corresponding to the via holes h in the color resistance layer 4, and the corresponding via holes h, h' in the dielectric layer and the color resistance layer are aligned with each other in a thickness direction of the base plate 1; and forming and patterning (for example, by etching) a third conductive layer 7 on the dielectric layer 6, wherein the third conductive layer 7 is electrically connected with a corresponding portion of the first conductive layer 2 through the aligned via holes h, h' of the color resistance layer 4 and the dielectric layer 6.

In the above method, the first conductive layer 2 is used as the bottom electrode of a projective capacitor. The black matrix 3 functions to reduce the light leakage between pixel regions and is made of light-blocking material. In an embodiment of the present invention, the black matrix is made of resin doped with light-blocking material. The color resistance layer 4 may comprise RGB resistance or RGBW resistance.

In the process of patterning the color resistance layer 4, the color resistance layer 4 is formed with one or more via holes h (for example, two square via holes) corresponding to each sub-pixel region. Each of the via holes h exposes the first conductive layer 2.

The locations, the number and the shapes of the via holes are not limited to the embodiments of the present invention. As mentioned above, the number, shape and size of the via holes should balance the requirements regarding aperture ratio and light saturation level.

The second conductive layer 5 is used as the top electrode of the projective capacitor.

The second conductive layer 5 does not overlap with the via holes in the color resistance layer, that is, the second conductive layer 5 is formed at the gaps between the via holes, so that the third conductive layer 7 may be connected with the first conductive layer 2 through the via holes.

In the above method, the second direction may be perpendicular to the first direction.

In the process of patterning the dielectric layer 6, the dielectric layer 6 is formed by etching with one or more via holes h', the one or more via holes h' expose the first conductive layer 2.

In the above method, the dielectric layer 6 may be made of inorganic dielectric material, for instance, SiNx.

As shown in FIGS. 1-2, the color resistance layer 4 is formed with two via holes h corresponding to each sub-pixel region, and the two via holes are provided at two sides of the second conductive layer 5 respectively. In the above method, alternatively, the step of forming the third conductive layer 7 comprises forming a plurality of first conductive strips extending in the first direction and corresponding to each sub-pixel region respectively, wherein, as shown in FIG. 1, the portions of each of the first conductive strips at two sides of the second conductive layer are directly above corresponding two via holes respectively.

As shown in FIGS. 1-2, the color resistance layer 4 is formed with two via holes h corresponding to each sub-pixel region, the two via holes are provided at two sides of the second conductive layer 5 respectively, and the via holes in the dielectric layer at each side of the two sides of the second conductive layer are aligned in a line. In the above method, alternatively, the step of forming the third conductive layer 7 comprises forming two second conductive strips extending in the second direction and provided at two sides of the second conductive layer 5 respectively, wherein, as shown in FIG. 2, each second conductive strip covers corresponding via holes which are aligned in a line.

In the above method, the extending direction of the third conductive layer 7 is not limited to the specific embodiments in the present invention, as long as the third conductive layer 7 covers the via hole regions in the color resistance layer 4 and the dielectric layer 6.

The materials of which the base plate 1, the first, second and third conductive layers 2, 5, 7 are made are similar to those mentioned above.

In an alternative embodiment of the present invention, the method further comprises forming an insulation layer on the base plate on which the third conductive layer has been formed. Alternatively, the insulation layer comprises an OC insulation film In an alternative embodiment of the present invention, the method further comprises forming spacers 9 on the insulation layer at positions corresponding to and above the black matrix. In the method, the spacers 9 function to insure the thickness of the display panel, and may be made of material with high elastic recovery rate and high pressure deformation capability, thus, the CF substrate is more stable in later celling process and thus the display panel has greater anti-compression and anti-deformation capability.

In the CF substrate obtained by the above method, the second conductive layer forms a capacitor C1 together with the first conductive layer, and at the same time forms a capacitor C2 together with the third conductive layer, wherein the capacitors C1 and C2 are connected in parallel, and the color resistance layer and the dielectric layer are used as the dielectrics of the capacitors C1 and C2 respectively. Therefore, for a pixel unit, the projective capacitance thereon will be increased, and further, the touch sensitivity of the touch panel is improved when the color filter substrate made by the method according to the present invention is applied to a high-resolution panel. In addition, in the CF substrate obtained by the above method, the via hole design, while meeting the requirements regarding high resolution, may effectively improve the aperture rate and thus insure the transmission rate of the display panel.

In the above method, the insulation film is provided to the CF substrate. The insulation film is used as the outermost layer of the CF substrate for planarization, and also may isolate LC so as to prevent touch signals from interfering with pixel display signals. Furthermore, by selecting the thickness of the insulation layer and the color resistance layer, a sufficient spatial height difference between the display part and the touch part of the display panel is ensured, which further reduces the interference between the touch signals and the pixel display signals. Therefore, the interference on the electric field for the pixels is reduced and normal display of the picture is obtained.

Although several exemplary embodiments have been shown and described, it would be appreciated by those skilled in the art that various changes or modifications may be made in these embodiments without departing from the principles and spirit of the disclosure, the scope of which is defined in the claims and their equivalents.

What is claimed is:

1. A color filter substrate comprising:
   a base plate;
   a first conductive layer formed on the base plate in a first direction;
   a color resistance layer formed on the first conductive layer at least at positions corresponding to pixel regions, wherein the color resistance layer is formed with via holes at positions corresponding to each sub-pixel region, the first conductive layer being exposed by the via holes;

a black matrix formed on the first conductive layer at positions corresponding to pixel gaps;

a second conductive layer electrically insulated from the first conductive layer and formed on the surfaces of the black matrix and the color resistance layer in a second direction different from the first direction, wherein the second conductive layer is formed at gaps between the via holes;

a dielectric layer formed at least on the second conductive layer, wherein the dielectric layer is formed with via holes corresponding to the via holes in the color resistance layer, and the corresponding via holes in the dielectric layer and the color resistance layer are aligned with each other in a thickness direction of the base plate; and a third conductive layer formed on the dielectric layer and electrically connected with a corresponding portion of the first conductive layer through the aligned via holes of the color resistance layer and the dielectric layer.

2. The color filter substrate of claim 1, wherein the third conductive layer comprises a plurality of conductive strips which are separated from each other and are electrically connected with the corresponding portions of the first conductive layer.

3. The color filter substrate of claim 2, wherein the color resistance layer is formed with two via holes corresponding to each sub-pixel region, and the two via holes are provided at two sides of the second conductive layer respectively.

4. The color filter substrate of claim 3, wherein the plurality of conductive strips comprise a plurality of first conductive strips corresponding to each sub-pixel region respectively, wherein the portions of each of the first conductive strips at the two sides of the second conductive layer are directly above corresponding two via holes respectively; and each of the plurality of first conductive strips extends in the first direction.

5. The color filter substrate of claim 3, wherein the via holes in the dielectric layer at each side of the two sides of the second conductive layer are aligned in a line.

6. The color filter substrate of claim 4, wherein the third conductive layer comprises two second conductive strips which are provided at two sides of the second conductive layer respectively and extend in the second direction, wherein each second conductive strip covers corresponding via holes which are aligned in a line.

7. The color filter substrate of claim 1, wherein the third conductive layer comprises a plurality of conductive sheets which are separated from each other and electrically connected with the corresponding portions of the first conductive layer.

8. The color filter substrate of claim 1, wherein the cross section of each via hole has a rectangular shape.

9. The color filter substrate of claim 1, further comprising an insulation layer covering the base plate on which the third conductive layer has been formed.

10. The color filter substrate of claim 9, wherein the insulation layer comprises an organic coating insulation film.

11. The color filter substrate of claim 10, further comprising spacers formed on the insulation layer at positions corresponding to the black matrix.

12. The color filter substrate of claim 1, wherein the first, second and third conductive layers are made of ITO, and/or the dielectric layer is made of transparent dielectric material.

13. The color filter substrate of claim 1, wherein the first direction is perpendicular to the second direction.

14. A display panel comprising the color filter substrate of claim 1.

15. A method for manufacturing a color filter substrate, comprising steps of:

forming and patterning a first conductive layer on a base plate in a first direction;

forming and patterning a color resistance layer at least on the first conductive layer at positions corresponding to pixel regions, and forming and patterning a black matrix on the first conductive layer at positions corresponding to pixel gaps, wherein the color resistance layer is formed with via holes at positions corresponding to each sub-pixel region, the first conductive layer being exposed by the via holes;

forming and patterning a second conductive layer on the surfaces of the black matrix and the color resistance layer in a second direction different from the first direction, wherein the second conductive layer is formed at gaps between the via holes, and the second conductive layer is insulated from the first conductive layer;

forming and patterning a dielectric layer at least on the second conductive layer, wherein the dielectric layer is formed with via holes corresponding to the via holes in the color resistance layer, and the corresponding via holes in the dielectric layer and the color resistance layer are aligned with each other in a thickness direction of the base plate; and forming and patterning a third conductive layer on the dielectric layer, wherein the third conductive layer is electrically connected with a corresponding portion of the first conductive layer through the aligned via holes of the color resistance layer and the dielectric layer.

16. The method of claim 15, wherein the color resistance layer is formed with two via holes corresponding to each sub-pixel region, and the two via holes are provided at two sides of the second conductive layer respectively;

the step of forming the third conductive layer comprises forming a plurality of first conductive strips extending in the first direction and corresponding to each sub-pixel region respectively, wherein the portions of each of the first conductive strips at two sides of the second conductive layer are directly above corresponding two via holes respectively.

17. The method of claim 15, wherein the color resistance layer is formed with two via holes corresponding to each sub-pixel region, the two via holes are provided at two sides of the second conductive layer respectively, and the via holes in the dielectric layer at each side of the two sides of the second conductive layer are aligned in a line;

the step of forming the third conductive layer comprises forming two second conductive strips extending in the second direction and provided at two sides of the second conductive layer respectively, wherein each second conductive strip covers corresponding via holes which are aligned in a line.

18. The method of claim 15, wherein the first direction is perpendicular to the second direction.

19. The method of claim 15, further comprising forming an insulation layer on the base plate on which the third conductive layer has been formed.

20. The method of claim 19, wherein the insulation layer comprises an organic coating insulation film.

* * * * *